Dec. 3, 1940.  P. RIME-BRUNEAU  2,223,461
ACTUATING MECHANISM FOR POPPET VALVES
Filed June 12, 1937  2 Sheets-Sheet 1

INVENTOR
Paul Rime-Bruneau
ATTORNEYS
Symmestvedt & Lechner

Dec. 3, 1940.  P. RIME-BRUNEAU  2,223,461
ACTUATING MECHANISM FOR POPPET VALVES
Filed June 12, 1937  2 Sheets-Sheet 2

INVENTOR
Paul Rime-Bruneau
BY
Symestvedt + Lechner
ATTORNEYS

Patented Dec. 3, 1940

2,223,461

UNITED STATES PATENT OFFICE 2,223,461

ACTUATING MECHANISM FOR POPPET VALVES

Paul Rime-Bruneau, Paris, France, assignor to the firm Societe d'Exploitation des Procedes Dabeg, Paris, France Application June 12, 1937, Serial No. 147,871
In France June 17, 1936

3 Claims. (Cl. 121—167)

This invention relates to driving or actuating mechanism for valves, more particularly for poppet valves used for the distribution of steam in steam engines or for valves of internal combustion engines or the like. Still more particularly, the invention relates to valve actuating mechanism providing positive actuation of the valves as to all movements thereof. Stated in another way, according to the invention both the closing as well as the opening movement of the valves is positively effected by means of cam actuating mechanism, no return springs or the like being relied upon for closing movement. This type of operation may be termed "desmodromic" actuation of the valves.

This type of actuation of valves of steam or explosion motors or the like is, generally speaking, effected by using a combination of cams and tippers or rocking shafts or the like together with cam follower rollers. In the arrangement described in French Patent No. 771,075 dated the 24th of June 1933, for instance, there is a cam and a counter-cam having their axes parallel to each other and located on either side of a follower or roller, the projecting parts of the cam corresponding to the depressions of the counter-cam, and the cam and counter-cam being connected with each other by means of gears which cause the same to rotate in synchronism. Such an arrangement thus requires two cam shafts together with the corresponding driving connections therefor.

The device according to the present invention comprises, in combination, a cam and a counter-cam located end to end on a common shaft and upon which cams follower rollers are adapted to ride, the rollers being located at the ends of arms conveniently made rigid or solid with an associated oscillating shaft or like member. The invention thus provides completely positive actuation of the associated valve or the like with a minimum of complication.

In the accompanying drawings which show by way of example an embodiment of the controlling device according to the invention:

Figure 1:
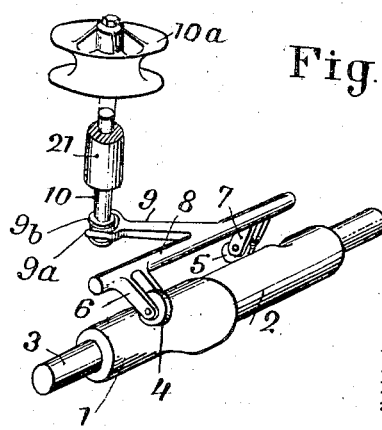
Figure 1 is a somewhat diagrammatic view of a valve actuating mechanism embodying the invention.

As shown in Figure 1, cam 1 and counter-cam 2 are keyed on a common shaft 3 which is driven through any convenient controlling gearing not shown in the drawings, for instance by the shaft of a motor. Said cams, as shown, have a continuous cam surface of a contour which varies in a direction axially of the cam shaft, so that upon relative axial adjustment between the cams and the cam followers, as by axial shifting of the cam shaft (which, per se, is common in the art here referred to) the timing of the valves is altered.

Follower rollers 4 and 5 are arranged to ride upon cam 1 and counter-cam 2, respectively, the rollers being journalled on the ends of arms 6 and 7, which are solid with a common shaft 8 having sufficient length to provide for longitudinal spacing of rollers. The shaft 8 is provided with an arm 9 terminating in a fork 9a which engages a groove 9b provided at the end of stem 10 of a poppet valve 10a of the type used, for example, for steam distribution in a locomotive steam engine. The stem 10 slides in a conventional guide 21.

As shown in Figure 1, arms 6 and 7, which carry rollers 4 and 5, are located on either side of the axis of shaft 3 in such a manner that the actuation of shaft 8 through cams 1 and 2, and rollers 4 and 5, is positive with respect to oscillation of the shaft in both directions. The profiles or shapes of cams 1 and 2, as well as the orientation of the same are arranged so that the oscillating movement of the shaft 8 may properly take place at any time and without any difficulty.

As will readily be understood, when several valves are located near the described controlling device, and when the phases required for the operation of said valves are angularly displaced relatively to one another, it is possible to actuate the same by means of a simple group of cams and of counter-cams in combination with a suitable number of oscillating shafts also displaced from each other around the cam shaft, according to the desired timing of the valves controlled by the several oscillating shafts.

Figure 3:
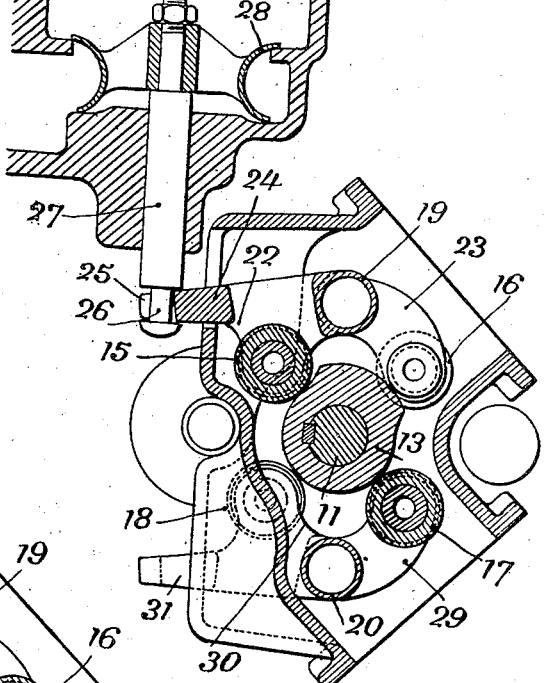
Figures 3 and 4 show cross sections along the lines III—III and IV—IV, respectively, of Figure 2.
Figure 4:
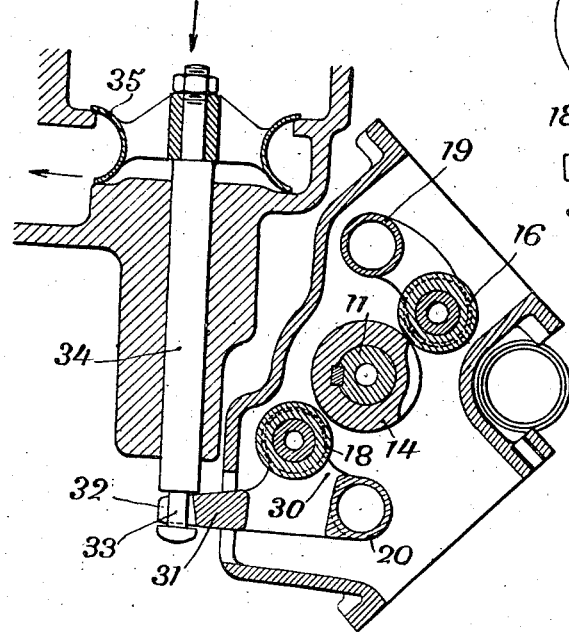
Figure 2:
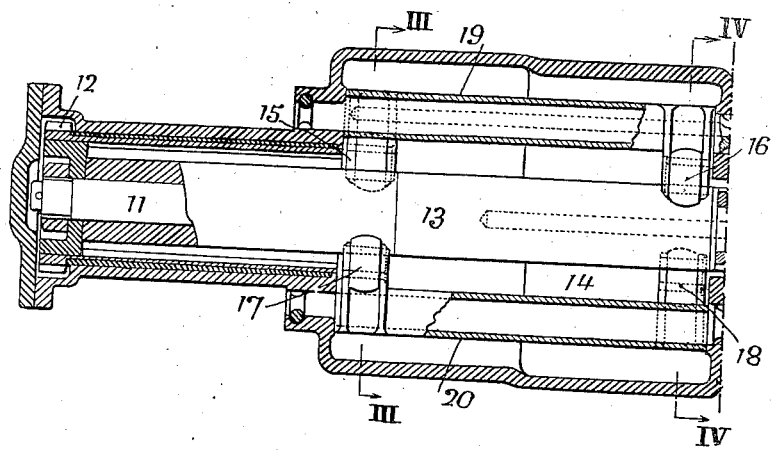
Figure 2 is a sectional view of an actuating device of the type shown in Figure 1 arranged to control two valves.

An example of such a realization of a multiple control device is shown in Figures 2 to 4.

In said figures, shaft 11 is provided at one end with a driving gear 12, which receives its movement from the motor shaft through a convenient coupling not shown in the drawings. The shaft 11 further carries a cam 13 and a counter-cam 14 keyed thereon and respectively cooperating with rollers 15, 16 and 17, 18, and thus controlling the shafts 19 and 20 which actuate the poppet valves of the engine with which the mechanism is being used.

The arrangement of Figures 2 to 4 is designed to control two valves whose phases are spaced apart 180° because the cranks of the corresponding cylinders are fixed at 180°. The shafts 19 and 20, being in diametrically opposed positions around the cam shaft 11, cause the valves to perform the same movements 180° out of phase.

As seen in Figure 3, rollers 15 and 16, which ride respectively on the cam 13 and the counter-cam 14, are pivotally mounted at the ends of levers 22—23 forming part of a tubular shaft 19 which carries an arm 24 terminating in a fork 25 which is accommodated in a groove 26 provided at the end of the stem 27 of a poppet valve 28.

Similarly, rollers 17 and 18 are pivoted on the ends of the levers 29 and 30 forming part of a tubular shaft 20 provided with an arm 31 which terminates in a fork 32 received in a groove 33 at the end of stem 34 of poppet valve 35. The valves 28 and 35 in the present case are distribution valves of a locomotive steam engine.

The constructional form of the device may, of course, vary according to every particular arrangement: for instance, each oscillating shaft could be provided with a hollow shaft swivelling on a supporting rod.

The cam and counter-cam may be either independent from each other and separately keyed upon the common shaft or they may be solid with each other and even with their shaft.

Every group constituted by a cam and a counter-cam may be used to actuate two or a larger number of rollers or groups of rollers for the operation of valves, said rollers being, of course, angularly displaced relatively to each other according to the relation which exists between the corresponding cyclinders.

This invention is applicable to distribution valves for steam engines or to valves of internal combustion engines, and generally speaking is applicable to the actuation of any members which must positively execute predetermined movements in a predetermined succession.

What I claim is:

1. Valve actuating and controlling mechanism including in combination with a valve, a cam shaft, a cam and a counter-cam mounted on said shaft for actuation thereby, a pair of cam followers riding respectively on said cams, the cams and followers being relatively displaceable in a direction axially of the cam shaft, and actuating connections between the followers and the valve providing positive cam-effected movement of the valve in both the opening and the closing directions, each cam having a continuous cam surface of contour which varies in a direction axially of the shaft, whereby relative displacement of the cams and followers in a direction axially of the cam shaft provides variable control for the valve while retaining the said positive valve actuation in both directions.

2. Valve actuating and controlling mechanism including in combination with a plurality of valves, a cam shaft, a cam and a counter-cam mounted on said shaft for actuation thereby, for each valve a pair of cam followers riding respectively on said cams, the pairs of followers being angularly offset from each other about the axis of movement of the cam, and the cams and followers being relatively displaceable in a direction axially of the cam shaft, and actuating connections between the followers of each pair and the valve associated therewith providing positive cam-effected movement of the valve in both the opening and the closing directions, each cam having a continuous cam surface of contour which varies in a direction axially of the shaft, whereby relative displacement of the cams and followers in a direction axially of the cam shaft provides variable control for the valves while retaining the said positive valve actuation in both directions.

3. Valve actuating and controlling mechanism including in combination with a valve, a cam shaft, a cam and a counter-cam mounted on said shaft for actuation thereby, a pair of cam followers riding respectively on said cams, the cams and followers being relatively displaceable in a direction axially of the cam shaft, a shaft on which said followers are mounted at axially spaced points, and an actuating connection for the valve connected with the shaft on which the followers are mounted at a point intermediate the followers, the mechanism providing positive cam-effected movement of the valve in both the opening and the closing directions, each cam having a continuous cam surface of contour which varies in a direction axially of the cam shaft, whereby relative displacement of the cams and followers in a direction axially of the cam shaft provides variable control for the valve while retaining the said positive valve actuation in both directions.

PAUL RIME-BRUNEAU.